(12) United States Patent
Thomasset et al.

(10) Patent No.: US 8,852,705 B2
(45) Date of Patent: Oct. 7, 2014

(54) PACKAGING FORMED FROM A BUTT-WELDED FILM

(75) Inventors: Jacques Thomasset, Vouvry (CH); Stéphane Mathieu, Vouvry (CH)

(73) Assignee: Aisapack Holding S.A., Vouvry (CH)

( * ) Notice: Subject to any disclaimer, the term of this patent is extended or adjusted under 35 U.S.C. 154(b) by 481 days.

(21) Appl. No.: 12/296,196

(22) PCT Filed: Apr. 6, 2007

(86) PCT No.: PCT/IB2007/051247
§ 371 (c)(1),
(2), (4) Date: Nov. 10, 2008

(87) PCT Pub. No.: WO2007/113780
PCT Pub. Date: Oct. 11, 2007

(65) Prior Publication Data
US 2009/0092792 A1 Apr. 9, 2009

(30) Foreign Application Priority Data

Apr. 6, 2006 (WO) .................. PCT/IB2006/051052
Jul. 31, 2006 (EP) ...................................... 06118170
Jul. 31, 2006 (EP) ...................................... 06118199
Nov. 24, 2006 (WO) .................. PCT/IB2006/054420

(51) Int. Cl.
| | | |
|---|---|---|
| B32B 27/32 | (2006.01) |
| B32B 7/00 | (2006.01) |
| B32B 37/00 | (2006.01) |
| B32B 38/00 | (2006.01) |
| B29C 65/44 | (2006.01) |
| B29C 65/00 | (2006.01) |
| B32B 7/12 | (2006.01) |
| B32B 15/20 | (2006.01) |
| B29C 65/50 | (2006.01) |
| B32B 27/10 | (2006.01) |
| B32B 27/36 | (2006.01) |
| B32B 27/30 | (2006.01) |
| B32B 27/00 | (2006.01) |
| B32B 15/12 | (2006.01) |
| B32B 27/08 | (2006.01) |
| B29C 65/02 | (2006.01) |
| B32B 15/08 | (2006.01) |
| B32B 3/08 | (2006.01) |
| B29L 9/00 | (2006.01) |
| B29K 23/00 | (2006.01) |
| B29L 23/20 | (2006.01) |
| B29K 67/00 | (2006.01) |
| B29K 305/02 | (2006.01) |

(52) U.S. Cl.
CPC ............ *B29C 65/5042* (2013.01); *B29C 65/44* (2013.01); *B32B 27/32* (2013.01); *B29C 66/72321* (2013.01); *B29L 2009/00* (2013.01); *B29C 66/1142* (2013.01); *B29C 66/4322* (2013.01); *B32B 15/20* (2013.01); *B29K 2023/065* (2013.01); *B29C 65/505* (2013.01); *B29L 2023/20* (2013.01); *B32B 27/10* (2013.01); *B32B 27/36* (2013.01); *B29K 2995/0053* (2013.01); *B29C 65/5021* (2013.01); *B29K 2067/00* (2013.01); *B29K 2023/086* (2013.01); *B32B 27/306* (2013.01); *B32B 27/00* (2013.01); *B32B 15/12* (2013.01); *B29K 2023/12* (2013.01); *B29C 66/723* (2013.01); *B32B 27/08* (2013.01); *B29C 66/7371* (2013.01); *B29C 65/02* (2013.01); *B32B 2307/514* (2013.01); *B32B 15/08* (2013.01); *B29L 2009/003* (2013.01); *B29C 66/43* (2013.01); *B32B 3/08* (2013.01); *B32B 2439/00* (2013.01); *B29K 2023/0633* (2013.01); *B29K 2305/02* (2013.01); *B29C 66/7234* (2013.01)
USPC .......... 428/57; 428/35.7; 156/280; 156/304.3

(58) Field of Classification Search
CPC  B29C 65/00; B29C 65/5021; B29C 65/5042; B29C 65/505; B29C 66/43; B29C 66/4322; B29C 66/1142; B29C 66/723; B29C 66/7234; B29C 66/73711; B32B 27/00; B32B 27/08; B32B 27/36; B32B 27/32; B32B 2439/00; B32B 2307/514; B32B 2023/00; B29L 2009/00
USPC ............ 428/57, 58, 35.7, 36.6; 426/110, 121, 426/126, 127; 156/280, 304.3, 304.1, 156/304.2, 304.6
See application file for complete search history.

(56) References Cited

U.S. PATENT DOCUMENTS

| | | | | |
|---|---|---|---|---|
| 4,156,054 A | * | 5/1979 | Gurewitsch | 428/583 |
| 4,690,668 A | * | 9/1987 | Rebmann et al. | 493/297 |
| 4,733,800 A | * | 3/1988 | Bjorkengren et al. | 222/107 |
| 5,672,398 A | * | 9/1997 | Johnson | 428/35.7 |
| 6,254,709 B1 | * | 7/2001 | Kamiyama et al. | 156/91 |

FOREIGN PATENT DOCUMENTS

| | | | |
|---|---|---|---|
| EP | 0 177 470 | | 4/1986 |
| EP | A2-0 177 470 | | 4/1986 |
| JP | 49-53966 | | 5/1974 |
| JP | 06-166107 | | 6/1994 |
| JP | 2001206393 A | * | 7/2001 |
| WO | 2005/095105 | | 10/2005 |
| WO | WO 2005/095105 | | 10/2005 |

OTHER PUBLICATIONS

Massey, Liesl K. "Permeability Properties of Plastics and Elastomers." Plastics Design Library. Norwich, NY. 2003. p. 51.*

Machine Translation JP 2001-206393 A. Jul. 31, 2001.*

International Search Report for PCT/IB2007/051247, mailed Nov. 9, 2007.

English Translation of International Preliminary Search Report on Patentability (Chapter II).

Japanese Office Action dated Jan. 10, 2012, and English translation.

* cited by examiner

*Primary Examiner* — Maria Veronica Ewald
*Assistant Examiner* — Nancy Johnson
(74) *Attorney, Agent, or Firm* — Nixon & Vanderhye P.C.

(57) ABSTRACT

Packaging produced from a thermoplastic film of which the ends are placed so that they abut, said film being composed of several layers, including at least a first weldable layer and a second layer of which the butt-welding is only partial or non-existent, and at least one thin strip covering said ends and being directly attached to one of the faces of the second layer, the difference in the melting point between the first layer and the other layer or layers being greater than 20° C.

9 Claims, 3 Drawing Sheets

PACKAGING FORMED FROM A BUTT-WELDED FILM

This application is the U.S. national phase of International Application No. PCT/IB2007/051247, filed 6 Apr. 2007, which designated the U.S, and claims priority to International Application No. PCT/IB2006/051052, filed 6 Apr. 2006; Europe Application No. 06118170.7, filed 31 Jul. 2006; Europe Application No. 06118199.6, filed 31 Jul. 2006; and International Application No. PCT/IB2006/054420, filed 24 Nov. 2006, the entire contents of each of which is hereby incorporated by reference.

FIELD OF THE INVENTION

The invention lies in the field of packaging formed using plastic films. More specifically, it relates to a packaging whose ends are butt-welded.

The invention also relates to a method for manufacturing a packaging produced from a thermoplastic film and whose ends are butt-welded.

PRIOR ART

Packaging prepared from films containing at least one plastic layer, forming for example bags, tubes or else brick packs, are known in the prior art. This packaging is, in particular, prepared by welding the ends of the film.

A first welding method consists in producing a joint known as a "wrong side-to-wrong side" joint in which the lower face of the film is welded to itself. This joint is illustrated in FIG. 1.

A second welding method consists in producing a joint known as a "wrong side-to-right side" joint in which the ends of the film are overlapped and the lower face of said film is welded onto the upper face of said film. This joint is illustrated in FIG. 2.

A third joining method known as a "butt joint" consists in welding the ends of the film without overlapping them. This method, illustrated in FIG. 3, is described in Patents WO 2005/095105A1 and U.S. Pat. No. 5,569,144 and U.S. Pat. No. 4,733,800.

By way of example, U.S. Pat. No. 4,733,800 describes the production of a flexible tube manufactured from a multilayer plastic film and having dead-fold properties; a property that is characteristic of flexible aluminium tubes. This patent proposes the use of a strip welded to the inside or the outside of the tube and joining at the welded ends, said strip containing a metal foil providing the dead-fold properties. The above-mentioned patent specifies that the thickness of the metal foil in the strip is greater than the thickness of the metal foil in the multilayer film. A major drawback of this patent is linked to the difficulty in sealing the ends of the tubular body prepared. To manufacture a tube for pasty products (for example, toothpaste), it is common to weld an injection-moulded tube head onto the end of the tubular body. Welding of a tube head onto a tubular body obtained according to the teaching of this U.S. Pat. No. 4,733,800 is particularly difficult to carry out. The ends of the welded strip create a discontinuity in the inner surface of the tubular body, consequently they cause a risk of leakage. It is also suggested in this patent to weld said strip to the outside of the tube. However, this large-thickness strip containing an aluminium layer significantly detracts from the aesthetics of the packaging.

U.S. Pat. No. 5,569,144 describes a device for butt-welding the ends of the film. The tube obtained has improved aesthetic properties, with an almost invisible welding zone. However, the low strength of the tube at the weld zone makes the commercial use of these tubes very risky.

International Patent Application WO 2005/095105 describes a method for improving the butt-welding of a multilayer film comprising a non-weldable layer. This method consists in using a laminate comprising weldable films at the lower and upper faces; the non-weldable layer trapped between the weldable films being set back from the ends of the film, so that during the butt-welding the weldable layers surround the non-weldable layer at its end and enable welding of the film over its entire thickness. This method improves the butt-welding of multilayer films, however the multilayer tubes produced according to the method proposed in Application WO 2005/095105 have a lower strength at the weld than the strength of the film.

The main difficulty in butt-welding is obtaining a weld zone of which the strength is close to the strength of the film. In particular, it is desired to overcome the brittle fracture mode that is observed at the butt-weld when a tensile stress is applied to the weld.

The invention makes it possible to produce butt-welded packaging from a multilayer film comprising at least one non-weldable layer; the packaging obtained according to the invention having a strength in the weld zone that is at least equal to the strength of the film, and improved aesthetic properties.

GENERAL SUMMARY OF THE INVENTION

The invention relates to the butt-welding of a film composed of several layers, including at least one functional layer and one weldable layer, said functional layer being at best partially welded. A strip is added that joins the ends of the film so as to compensate for the loss of strength at the weld zone; the loss of strength being linked to the fact that the ends of said functional layer are at best partially welded or that the weldable layer has reduced properties at the weld.

The various aspects of the invention will be better understood from the following figures and their detailed description:

FIGS. 1 to 4 describe the main methods described in the prior art for joining the ends of a film.

FIG. 1 illustrates the welding known as wrong side-to-wrong side welding, which consists in joining the ends 5 of said film 2 on its lower face 4, said lower face being located on the inside of the packaging.

FIG. 2 illustrates the welding method known as wrong side-to-right side or overlap welding, which consists in welding the ends 5 of the film 2; the upper face 3 of the film 2 being joined to the lower face 4 of the film 2; said lower and upper faces being located respectively on the inside and the outside of the packaging.

Figure 1:
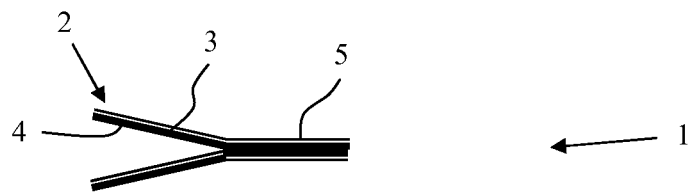
Figure 2:
Figure 3:
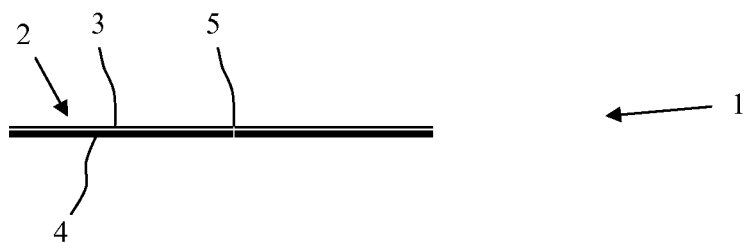
FIG. 3 illustrates the welding method known as butt-welding of the ends 5 of the film 2.
Figure 4:
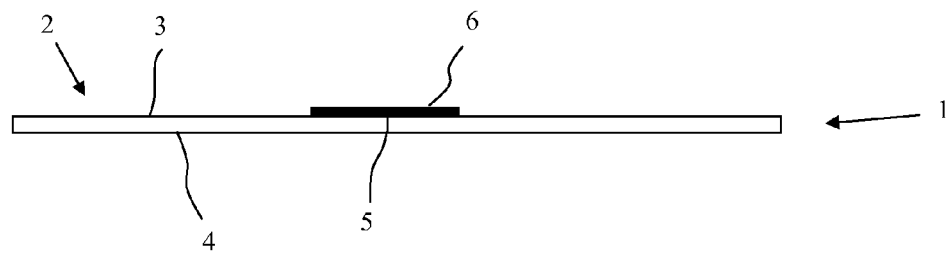
FIG. 4 shows a type of joint known in the prior art.
Figure 5:
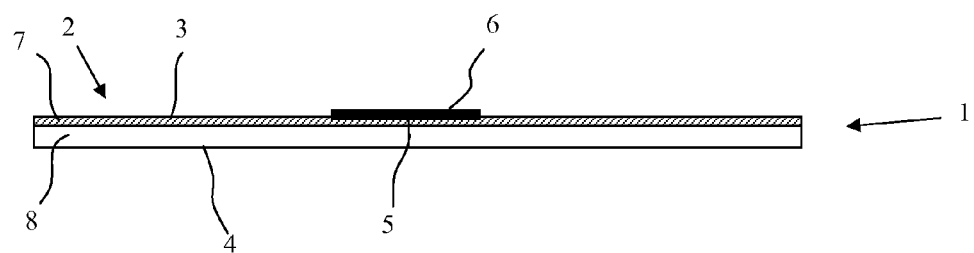

FIG. 5 illustrates a preferential method of the invention consisting of a joint 1 of the ends 5 of the film 2; the film 2 being formed from at least one weldable layer 8 and one functional layer 7, said ends 5 being butt-welded only at the weldable layer 8; a thin strip 6 being bonded onto the upper face 3 of the film 2 and joining the non-welded ends of the layer 7.

Figure 6:
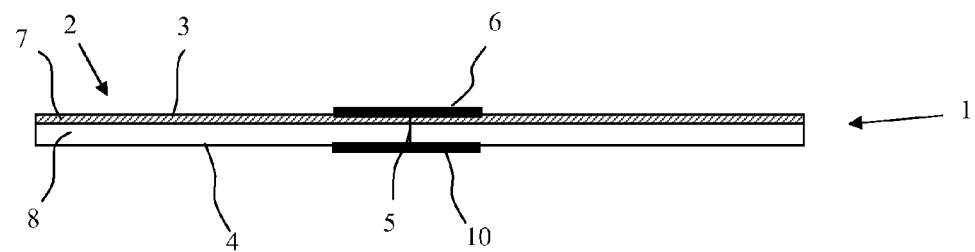

FIG. 6 illustrates the joining of a film 2 that is partially butt-welded at its ends 5, a strip 6 being added onto the upper face 3 of the joint forming the outer surface of the packaging; a second strip 10 being added onto the lower face 4 of the packaging and forming the inner surface of the packaging; said strips 6 and 10 joining the partially-welded ends 5.

Figure 7:
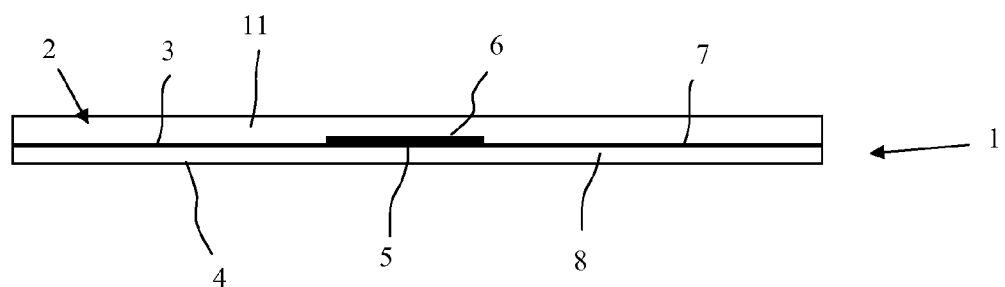

FIG. 7 illustrates the fact that a coating layer 11 may be added to the outer surface 3, in order to cover the entire surface of the film 2 and the strip 6. The coating layer 11 forms the outer surface of the packaging, the strip 6 is trapped in the multilayer structure.

Figure 8:
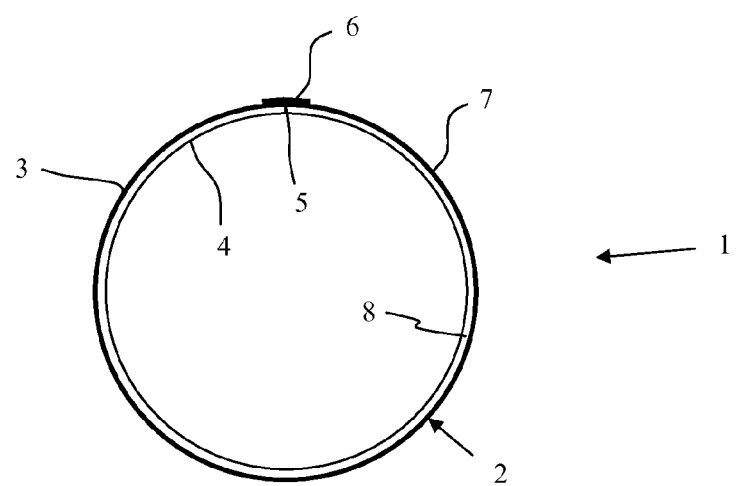

FIG. 8 illustrates the production of a tubular body according to the preferential mode of the invention.

DETAILED SUMMARY OF THE INVENTION

Definition of the terms used in the summary of the invention:

Welding: operation consisting in joining, by melting, two materials having the same nature or that are miscible in the melt state, said miscibility being manifested by the diffusion and interpenetration of the molecular chains; then in cooling said materials in order to freeze the state of molecular interpenetration.

Bonding: operation for joining two materials that are not of the same nature or that are immiscible in the melt state. Bonding may take place by chemical mechanisms (reaction of the chain ends, crosslinking), or by physical mechanisms (van der Waals forces, evaporation). Bonding is a joining operation which may be carried out at room temperature or by heating the materials.

Weldable layer: layer whose main characteristic is enabling and facilitating the preparation of the packaging by welding.

Functional layer: layer whose main characteristic is providing properties other than the ability to be welded. Functional layers generally having a small thickness are used, for example, to improve the appearance of the packaging (printed layers, transparent layers), to improve the strength of the packaging (biaxially-oriented layers, technical layers), to provide barrier properties (to oxygen, aromas) or to provide functionality (easy tearing for opening the packaging).

The weldable layers are generally based on polyolefins (polyethylene, polypropylene). Butt-welding brings into contact a very small amount of material, which makes it more difficult to obtain a strong joint. It has been observed that a weldable layer composed of a blend of 80% linear low-density polyethylene and 20% radical low-density polyethylene enabled a strong weld to be obtained.

The functional layers are based on a wide variety of resins (for example: PET, PA, PS, EVOH, PVDC), the choice of which depends on the desired properties. The main functional layers used today are uniaxially- or biaxially-oriented (PP, PET, PA, PS) layers or films with barrier properties (PET with deposition of an SiOx, PVDC, EVOH, PA coating). A functional layer may also be made of aluminium or paper.

The invention makes it possible to obtain welded packaging with a negligible variation in the thickness at the weld zone and having a strength in the weld zone equivalent to the strength of the film. The packaging obtained may be printed over its entire surface without a break in the printing in the weld zone.

FIG. 5 illustrates a preferential mode of the invention. This preferential mode consists of the joint 1 of the ends 5 of a film 2 comprising at least one weldable layer 8 as the lower surface 4 and one functional layer 7 as the upper surface 3; said upper face 3 forming the outer surface of the packaging and said lower surface 4 forming the inner surface of the packaging. Butt-welding of the ends 5 results in a partial joining of the ends of the film 2, the functional layer 7 not being butt-welded. A strip 6 is bonded or welded onto the upper surface 3 of the film in order to join the non-welded ends of said layer and to reinforce the joint. The strip 6 is often bonded onto the functional layer 3, welding of a strip onto the surface 3 of said functional layer generally being impossible. Said strip 6 may be printed or transparent, it may contain a barrier layer in order to compensate for a possible discontinuity of the barrier layer in the weld zone. The thickness of the strip 6 is small compared to the thickness of the film 2. The thickness of the strip is preferentially between 10 and 60 microns. The strip may be applied before or after butt-welding of the laminate. The weldable layer 8 forming the inner surface 4 of the packaging guarantees the hygiene properties on the inside of the packaging and at the joint.

The packaging prepared according to the preferential mode of the invention illustrated in FIG. 5 is particularly advantageous and innovative. This preferential mode of the invention makes it possible to prepare packaging by butt-welding films comprising only two layers, a first layer being weldable and a second layer being functional. The packaging prepared according to this method may be printed over the entire surface of the packaging without discontinuity at the weld zone. The strip 6 is preferably transparent and of small thickness in order not to change the appearance of the packaging. The strip 6 may also be printed.

The preferential mode illustrated in FIG. 5 is advantageous for butt-joining films comprising layers whose difference in melting point is greater than 20° C. The joining of these films according to the preferential method consists in heating said film to a temperature close to the melting point of the weldable layer and in joining the ends of said film via a bonded or welded strip.

FIG. 6 illustrates the case where a first strip 6 is added onto the outer face of the packaging and a second strip 10 is added onto the inner face of the packaging. The joint presented in FIG. 8 is advantageous when the thickness of the weldable layer 8 is small. The strip 6 is generally bonded onto the upper face 3 of the functional layer 7, whereas the strip 10 is advantageously welded onto the lower face 4 of the layer 8 forming the inner surface of the packaging.

One variant of the invention illustrated in FIG. 7, consists in depositing a synthetic resin layer 11 that covers the outer surface of the film 2; said synthetic resin layer 11 covering the entire surface 3 of the film 2 and also the surface of the strip 6, so that the strip 6 is trapped inside the joint 1. The joint illustrated in FIG. 7 is particularly advantageous for preparing tubular bodies whose welding zone is completely invisible, and having a high strength in the weld zone. The coating layer 11 is preferentially extruded onto the surface of the film 2 and said layer is chosen to adhere to the surface of the film 2 and the strip 6. The coating 11 may contain several layers in order to improve the adhesion to the film 2, to improve the barrier properties or the surface properties of the packaging.

FIG. 8 illustrates the preparation of a tubular body by butt-welding a film according to the preferential method of the invention. This tubular body is particularly advantageous as it may be prepared with a film comprising only two layers, a first layer being weldable and a second layer being functional. This film cannot be used to prepare a tubular body according to the prior art as the welding of the upper face onto the lower face of said film is impossible. The invention makes it possible to produce stronger and more aesthetic packaging and makes it possible to use a greater variety of multilayer films.

The butt-welding of films as described previously is particularly advantageous because it enables packaging to be prepared having improved aesthetic properties; the improvement in the aesthetics of the packaging being linked to the fact that the welding zone is barely visible and that the wall of the packaging has a negligible overthickness at the weld zone.

The invention is not limited to the examples illustrated in FIGS. 5 to 8. Tubular bodies may be produced according to the methods presented in FIGS. 5 to 7. Other methods resulting from the combination of the methods illustrated in FIGS. 5 to 7 also make up part of the invention as do the equivalent uses.

The invention makes it possible to produce packaging that is economical, of small thickness and of high strength. The invention may be used for joining multilayer plastic films but also for films comprising aluminium layers, paper or cardboard layers.

The thickness of the strip is small compared to the thickness of the films. In general, the thickness of the strip is 5 to 10 times smaller than the thickness of the film. The thickness of said strip is preferentially between 10 and 60 microns. The strip may be printed or transparent; it may be bonded or welded onto the surface of the laminate; it may contain a barrier layer in order to improve the barrier properties of the joint. The strip may be applied before or after butt-welding of the laminate. The strip may be an adhesive strip whose application is carried out at room temperature, the strip may be bonded by addition of adhesive to the interface between the film and said strip, the strip may be bonded by heating said strip, the strip may be welded. The adhesion strength of the strip onto the surface of the film is one factor determining the strength of the joint. Too low an adhesion strength leads to risks of fracture of the joint when a pressure, tensile, bending, impact, or fatigue stress is applied to the packaging. Thus, it is desired to obtain a strong adhesion between the strip and the film so that said strip cannot be separated from said film.

The strip may be welded or bonded onto the surface of the film. It is often favourable to bond the strip onto the film on the upper surface of the joint forming the outer surface of the packaging. Many adhesives and bonding methods may be envisaged. By way of example, a first method consists in adding a strip onto which the adhesive has previously been applied. A first variant of this method is the adhesive strip that can be applied at room temperature, a second variant is an adhesive strip that is bonded by heating. The use of an adhesive strip results in a method that is easy to control and easy to scale up to an industrial level. Another method consists in applying the adhesive to the strip or the film at the time of joining. The use of two-component reactive adhesives makes it possible to obtain strong adhesion levels. Generally, the bonding operation does not require any particular surface treatment of the joining zone, however it is possible to carry out surface treatments before bonding (for example, corona treatment).

When the strip is bonded onto the surface of the film, it is sometimes advantageous to terminate the strip before the end of the tubular body. The strip therefore extends over one part only of the length of the tubular body. When joining the end of the tubular body and the tube head, it is often preferable that the strip be absent from the joining zone.

Depending on the method of application and the properties to be provided, there are various types of strips.

1—the strip is welded: it comprises a layer of weldable (coextruded, amorphous, coated) PET, coextruded OPP, PE, PP or heat-sealable coating, for example.

2—The strip is bonded and is coated with adhesive. Its only distinctive feature is having a layer of adhesive on the surface, which is either an adhesive that can be used at high temperature or at low temperature. The adhesive may be deposited in-line or be present on the strip. The strip is then stored in the form of rolls, the adhesive then being protected by a silicone paper or film. The silicone may optionally be deposited directly onto the outer surface of the strip and thus make it possible to avoid having to remove the silicone protection at the time of positioning the strip.

Any type of material can be used for this strip, and in particular the materials described in points 1 and 2, to which paper and aluminium may be added. The definition of the strip will then be guided by the properties that are desired in terms of barrier, mechanical resistance and appearance properties.

3—The strip is bonded but is not itself coated with adhesive. The adhesive may be deposited onto the film 2 or be deposited in-line. The materials that can be used are the same as for point 1 above.

In order to provide barrier properties, the strip may include an aluminium layer, a PET or OPP barrier layer (with PVOH, PVDC, SiOx, AlOx or metallization coating or any other commercially available film), or a layer coextruded with an EVOH type barrier.

Generally, and to ensure continuity of the product properties, the reinforcing strip may include the same functional layers as the films 2 used for the packaging, that is to say PET, OPP, OPA, barrier PET, metallized PET, barrier OPP, metallized OPP, aluminium paper, PE, PP, etc.

The strip may also be composed of several layers. It may be, for example, made from OPP, PET, paper, PE, PP, OPA, PA, PET/PE, OPP/PE, OPA/PE, paper/PE, PET/Al, OPP/Al, OPA/Al, PET/Al/PE, PET/Al/PP, OPP/Al/PE, OPP/Al/PP, OPA/Al/PE, OPA/Al/PP, paper/Al/PE, paper/PET, paper/Al, etc. Only the generic name of the products is mentioned here. This name covers the whole product family. PET may thus be a conventional biaxially-oriented PET, an amorphous PET, a coextruded PET, an SiOx PET, an AlOx PET, a metallized PET, etc. PE comprises all the PE-based coextruded films; they may, amongst other things, comprise an EVOH or PA layer. This is the same for the other references.

More generally, all the films on the market in a range of thicknesses from 10 to 60 microns may be present alone or as several layers in these strips.

The invention is particularly advantageous for preparing flexible tubes for cosmetic, pharmaceutical or food products.

EXAMPLES

In the examples that follow, the multilayer structures are described from the outer face towards the inner face of the packaging, that is to say from the upper face towards the lower face of the joint. To simplify the understanding of the invention, the adhesive layers that join the weldable and functional layers of the film 2 are not shown. Only the layer of adhesive that provides the cohesion between the strip 6 or 10 and the film 2 is specified.

Example 1

Joint produced according to the preferential method of the invention, illustrated in FIG. 5:

| | |
|---|---|
| Joint 1: | PET/adhesive - PET/PE |
| Film 2: | PET/PE |
| Functional layer 7: | PET - thickness 30 microns |
| Weldable layer 8: | PE - thickness 180 microns |
| Strip 6: | PET/adhesive - thickness 40 microns |
| Adhesive: | Bostik Vitel 1912 |

Example 2

Joint produced according to the preferential method of the invention, illustrated in FIG. 5:

| | |
|---|---|
| Joint 1: | BOPP/adhesive - BOPP PVOH/PE |
| Film 2: | BOPP PVOH/PE |
| Functional layer 7: | BOPP PVOH - thickness 40 microns |
| Weldable layer 8: | PE - thickness 200 microns |
| Strip 6: | PET/adhesive - thickness 60 microns |
| Adhesive: | Bostik TLH 2013 |

Example 3

Joint produced according to the method illustrated in FIG. 6:

| | |
|---|---|
| Joint 1: | PA/PE - PE/PA/PE |
| Film 2: | PE/PA/PE |
| Functional layer 7: | PA - thickness 40 microns |
| Weldable layer 8: | PE - thickness 200 microns |
| Strip 6: | PA/PE - thickness 60 microns |

Example 4

Joint produced according to the method illustrated in FIG. 7:

| | |
|---|---|
| Joint 1: | PE/Alminium/PE - PE |
| Film 2: | PE/Alminium/PE |
| Functional layer 7: | Aluminium - thickness 8 microns |
| Weldable layer 8: | PE - thickness 80 microns |
| Weldable layer 9: | PE - thickness 120 microns |
| Strip 6: | PE - thickness 60 microns |

Example 5

Joint produced according to the method illustrated in FIG. 8:

| | |
|---|---|
| Joint 1: | PET/adhesive - KRAFT/Alminium/PE - PE |
| Film 2: | KRAFT/Alminium/PE |
| Functional layer 7: | KRAFT/Alminium |
| Weldable layer 8: | PET - thickness 40 microns |
| Strip 6: | PET/adhesive - thickness 60 microns |
| Adhesive | Bostik TEE 222 |
| Strip 10: | PE - thickness 40 microns |

OTHER EXAMPLES

In a non-exhaustive way, mention may be made of a certain number of films that can be used for butt-welding:
PE EVOH PE, PE/Al/PE, PET/Al/PE, PET/PE, OPP/Al/PE, OPP/PE, Kraft/PE, Kraft/Al/PE These same structures may be produced with a weldable PP instead of PE.

Only the generic name of the products is mentioned here. This name covers the whole product family. PET may thus be a conventional biaxially-oriented PET, an amorphous PET, a coextruded PET, an SiOx PET, an AlOx PET, a metallized PET, etc. PE comprises all the PE-based coextruded films; they may, amongst other things, comprise an EVOH or PA layer.

More generally, all the films on the market may be present in a butt-weldable film on condition that the joint comprises at least one weldable film.

The invention claimed is:

1. A packaging comprising:
   (a) a thermoplastic film,
      wherein said film has a thickness and comprises ends and at least a first weldable layer and a second layer,
      wherein said ends are placed so that they abut,
      wherein the first layer has first layer ends that are butt-welded,
      wherein the second layer has second layer ends and any butt-welding of the second layer ends is non-existent butt-welding,
      wherein said first layer ends and said second layer ends are in direct contact, and
   (b) at least one thin strip having a thickness that is smaller than the thickness of said film,
      wherein said strip covers said film ends and said strip is directly attached to an outer surface of the second layer, and
   wherein the first layer has a first layer melting point, the second layer has a second layer melting point, and the difference in the melting points of the first layer and the second layer is greater than 20° C.,
   wherein the first layer is based on a polyolefin, and the second layer is uniaxially-oriented or biaxially-oriented,
   wherein the packaging has an outer surface and an inner surface,
   wherein the second layer forms the outer surface of the packaging,
   wherein the first layer forms the inner surface of the packaging and is in contact with a product inside the packaging, and
   wherein the packaging is configured as a flexible packaging for containing cosmetics, pharmaceuticals, or food products.

2. The packaging according to claim 1, wherein the film has sides, and wherein the packaging comprises two strips attached to the ends of the film and placed on each side of the film.

3. The packaging according to claim 1, wherein the at least one thin strip is bonded to the outer surface of the second layer.

4. The packaging according to claim 1, wherein the second layer and the at least one strip are covered by a layer of synthetic resin.

5. A method for producing a packaging, said method comprising butt-welding the ends of a film composed of several layers, the film ends being put in direct contact, said film comprising at least the first weldable layer whose first layer ends are butt-welded and the second layer having second layer ends and any butt-welding of the second layer ends is non-existent butt-welding; wherein the ends of the film are placed so that they abut and then are successively heated and cooled in order to weld the ends and in that at least one strip is attached to the second layer so as to cover said ends, and wherein said method results in the packaging according to claim 1.

6. The method according to claim 5, wherein the strip is attached to the second layer prior to said heating and cooling operations.

7. The method according to claim 5, wherein the strip is attached to the second layer after said heating and cooling operations.

8. The method according to claim 5, wherein the strip is attached to the second layer at the same time as said heating and cooling operations.

9. The method according to claim 5, in which at least one synthetic resin layer is deposited which covers the surface of the joint formed from said film and from said strip or said strips.

* * * * *